US007818328B2

(12) United States Patent
Bottger et al.

(10) Patent No.: US 7,818,328 B2
(45) Date of Patent: Oct. 19, 2010

(54) API FOR OBTAINING UNAMBIGUOUS REPRESENTATION OF OBJECTS IN A RELATIONAL DATABASE

(75) Inventors: Todd A. Bottger, Foster City, CA (US); Arun Balasubramanyam, Newark, CA (US); Ashish A Joshi, San Mateo, CA (US); Karim M. Fateem, San Mateo, CA (US)

(73) Assignee: Siebel Systems, Inc., San Mateo, CA (US)

( * ) Notice: Subject to any disclaimer, the term of this patent is extended or adjusted under 35 U.S.C. 154(b) by 244 days.

(21) Appl. No.: 11/336,740

(22) Filed: Jan. 20, 2006

(65) Prior Publication Data

US 2007/0198987 A1   Aug. 23, 2007

(51) Int. Cl.
   *G06F 7/00* (2006.01)
   *G06F 17/30* (2006.01)
(52) U.S. Cl. ...................... 707/755; 707/610
(58) Field of Classification Search ............... 715/776; 717/120, 106; 719/312; 707/104.1, 736, 707/755, 609, 610
   See application file for complete search history.

(56) References Cited

U.S. PATENT DOCUMENTS

| | | | |
|---|---|---|---|
| 6,226,792 B1 * | 5/2001 | Goiffon et al. .............. 717/120 |
| 6,301,583 B1 * | 10/2001 | Zellweger ............... 707/103 R |
| 6,553,563 B2 * | 4/2003 | Ambrose et al. ............ 717/116 |
| 6,574,635 B2 * | 6/2003 | Stauber et al. .......... 707/103 R |
| 6,760,733 B1 * | 7/2004 | Komine et al. .............. 707/102 |
| 6,775,824 B1 * | 8/2004 | Osborne et al. ............. 717/125 |
| 6,789,251 B1 * | 9/2004 | Johnson ...................... 717/100 |
| 6,965,903 B1 * | 11/2005 | Agarwal et al. .......... 707/104.1 |
| 6,993,747 B1 * | 1/2006 | Friedman ..................... 717/124 |
| 7,028,037 B1 * | 4/2006 | Agarwal et al. ............. 707/100 |
| 7,039,899 B1 * | 5/2006 | Quiroga ...................... 717/115 |
| 7,058,890 B2 * | 6/2006 | George et al. ............... 715/728 |
| 7,073,096 B2 * | 7/2006 | Pouyollon .................... 714/38 |
| 7,197,466 B1 * | 3/2007 | Peterson et al. ................ 705/1 |
| 7,272,818 B2 * | 9/2007 | Ishimitsu et al. ............ 717/108 |
| 2003/0192027 A1 * | 10/2003 | Porter ........................ 717/100 |
| 2005/0034103 A1 * | 2/2005 | Volkov ........................ 717/124 |
| 2005/0268284 A1 * | 12/2005 | Clemm et al. ................ 717/121 |
| 2006/0015843 A1 * | 1/2006 | Sabbouh ..................... 717/106 |

* cited by examiner

*Primary Examiner*—James Trujillo
*Assistant Examiner*—Jeffrey Burke
(74) *Attorney, Agent, or Firm*—Campbell Stephenson LLP (57) ABSTRACT

Various techniques for providing an application program interface (API) that facilitates the retrieval of information stored in a configuration repository directly from the configuration repository are provided. The API provides a direct channel of communication into the configuration repository through which a user can obtain an unambiguous representation of the objects in the configuration repository. When requested, the API retrieves an object or objects from the configuration repository, translates the retrieved result into an intermediate, well-defined representation that unambiguously represents the requested object or objects, and provides the requestor the unambiguous representation of the object or objects.

22 Claims, 5 Drawing Sheets

```
<SiebelObjTree>
  <Obj OT="SiebApplication" RN="Siebel Universal Agent" UN="Siebel Call Center" ...>
    <Obj OT="SiebScreen" RN="Accounts Screen" UN="Accounts" ...>
      <Obj OT="SiebView" RN="My Accounts View" UN="My Accounts" ...>     ⎫
        <Obj OT="SiebApplet" RN="My Accounts List Applet" UN="Accounts" ...>  ⎬ 102
          <Obj OT="SiebTextArea1" RN="foo" UN="bar" ... ></Obj>           ⎪
          <Obj OT="SiebTextArea1" RN="foo2" UN="bar2" ... ></Obj>         ⎭
          ....
        </Obj> <!-- *** SiebApplet *** >
      </Obj> <!-- *** SiebView *** -->
    </Obj> <!-- *** SiebScreen *** -->
  </Obj> <!-- ***SiebApplication *** >
</SiebelObjTree>
```

API FOR OBTAINING UNAMBIGUOUS REPRESENTATION OF OBJECTS IN A RELATIONAL DATABASE

BACKGROUND

A variety of software development tools (or "SDTs") is available to software developers, and can provide functionality to assist in the creation and/or modification of software programs (or "applications") that include actual GUIs.

Some SDTs may abstract software to be generated in various ways, and may then provide functionality related to that abstraction. For example, some SDTs may support a layered architecture in which objects in a given layer depend on objects in the next lower layer and are insulated from other layers in the structure. One such layered structure includes a logical user interface objects layer (e.g., that includes user interface objects to define the visual interface that a user sees and interacts with), a business objects layer (e.g., that includes business objects to combine data from data objects into logical data constructs for presentation to the user by user interface objects), and a data objects layer (e.g., that includes data objects to provide a logical representation of data structures from underlying databases in order to provide access to those data structures by business objects). SDTs with such a layered structure may allow corresponding objects to be defined at some or all of the layers as part of a software program being generated.

Objects can also be used in various ways by SDTs, such as by having each object implement one piece of a software program being generated. Such software program pieces implemented by objects may include, for example, an element of a user interface (e.g., a popup window for record selection), an abstract data representation (e.g., a database column), or a direct database representation or construct (e.g., a join relationship between database tables). Properties of such an object may represent characteristics of the software construct that the object implements (e.g., the name, data type, and length of a database column, or the title bar caption of a popup window). Some SDTs may also support hierarchical (or parent-child) relationships between different objects, such as when a parent object represents a table and child objects represent columns of the table.

SDTs may represent created objects in various ways, such as with a set of properties having assigned values. The created objects may be implemented directly as an object in an underlying object-oriented programming language (e.g., C++), or instead may be abstracted in various ways. In addition, some or all objects may have assigned sets of behaviors, such as by having an associated set of one or more software routines (e.g., via a DLL assigned to the object). An SDT may also provide one or more existing objects, such as a core set of objects, and allow a user to use those existing objects as a basis for an application being generated.

In addition, some SDTs may provide various tools to assist in creating objects. For example, software wizards may be provided for each of various object types to step users through the process of creating and configuring objects of those types. For example, a wizard may guide the user through providing various types of information, and then use that information to specify property settings for the object being created. Different wizards may be available from some SDTs for a variety of object types, such as table applets, chart applets, tree applets, form applets, multi-value group applets, pick list applets, views, screens, etc. In addition, tools may be available to validate created objects to help ensure that the objects are logically consistent, such as to check for invalid references to other objects.

As mentioned above, some SDTs may allow logical user interface objects to be specified for a software program in order to define the visual interface that a user of the software program will interact with. Such user interface objects may present data to users for viewing and/or modification, such as data from business objects. A variety of user interface elements may be represented by user interface objects, including control toolbar and menu elements, dropdown lists, view tabs, screen tabs, menu buttons, control buttons, etc.

One example of a type of logical user interface object in some SDTs is an "applet" object type that is used to implement higher-level user interface elements composed of lower-level user interface elements, such as data controls, editable scrolling tables, forms for data entry, business graphics, pop-up windows for multi-value groups and record selection, etc. that are composed of controls such as a text box, check box, command button, etc. For some SDTs, an applet provides access to the data of a single business component (e.g., for viewing, editing, and modifying fields in the business component), and may be able to be configured to allow data entry for a single record, to provide a scrolling table displaying multiple records, or to display business graphics or a navigation tree.

Some SDTs may also support a "view" user interface object type that is used to present one or more other user interface objects (e.g., applet objects) together at one time in a predefined visual arrangement and logical data relationship. Views may have names, and in some user interfaces may be selected by name from menus and/or displayed tab symbols. For some SDTs, each view is mapped to a single business object, and if so each applet in such a view may map to a business component in that business object.

Some SDTs may also support "screens" that are a collection of one or more related views, such as with an appropriate screen user interface object type. For some SDTs, all views in some or all screens are mapped to the same business object. In addition, for some SDTs a screen is not a visual construct itself, but is instead a logical collection of views to be displayed together.

Some SDTs may use a collection of screens as a user interface for a software program. In some situations, an application may have one or more associated URLs that a user may specify to access the application, such as when a Web engine will be used to generate HTML pages to present the screens. One or more page tabs may be displayed, with each page tab object associated with a screen of the application.

The various existing SDTs store the objects that comprise the software programs and the GUIs in a normalized form in a database. Because of the manner in which the objects are stored in the database, the objects have no meaning or, at a minimum, lose their meaning, apart from the software program and the GUIs to which the objects belong. While the existing SDTs assist in generating the software programs and GUIs, they do not facilitate direct access of the objects from the database in a meaningful manner. In order to access these objects within their proper context, for example, to place the objects into a test tool's repository in order to test the functionality of a software program and the GUIs, the test tool is required to access the objects via the software program and the GUIs.

DETAILED DESCRIPTION

I. Introduction

Various techniques for providing an application program interface (API) that facilitates the retrieval of information stored in a configuration repository directly from the configuration repository are provided. The API provides a direct channel of communication into the configuration repository through which a user can obtain an unambiguous representation of the objects in the configuration repository.

When a developer uses a SDT, such as, by way of example, any one of the products in the Siebel 7 Enterprise Product Family commercially available from Siebel Systems, Inc., of San Mateo, Calif., to develop (i.e., create) an application, the SDT stores the objects that comprise the application, including the GUIs of the application, in the SDT's configuration repository. The configuration repository may be a relational database, in which the application objects are maintained in relational tables. The various tables included in the configuration repository may be logically organized into the following types: object tables, and intermediate tables, etc. The object tables may define the application objects, and may contain columns that define attributes of the objects. In one embodiment, these object tables may be defined and used by the applications. Depending on the object being defined, the attributes may include, by way of example, name, height, width, data type, display value, caption of a popup window, etc. The intermediate tables are tables that are used to implement a one-to-many relationship between two application objects. The intermediate tables store information pertaining to a relationship between different application objects at two levels, such as a parent-child relationship. As such, the collection of the intermediate tables, when combined, is able to provide the hierarchical information for an application.

In some embodiments, the API allows for the retrieval of information directly from the configuration repository by returning the metadata retrieved from the repository in a format that is readily usable by the retriever. When requested, the API retrieves an object or objects from the configuration repository, translates the retrieved result into an intermediate, well-defined representation that unambiguously represents the objects, and provides the requestor the unambiguous representation of the object or objects. In some embodiments, the unambiguous representation of an object includes the hierarchical path (i.e., full path) for the object within the application. The hierarchical path for the object may start from the root (i.e., the identification of the application), and specify a path to a location where the object is found in the hierarchy.

Software programs, such as test automation tools, can use the API to retrieve unambiguous representations of an application's objects directly from the data repository. Using the API, the software programs will be able to pre-populate their own object repositories directly from the configuration repository. In the case of automated test tools, users will be able to synchronize the test tool with the application's configuration repository while the application is still under development in order to create test scripts even without the application. For example, users can use the test tool to create test automation assets as soon as application configuration begins. The users do not have to wait until a fully configurable live application is available, and then interactively record the test scripts as in the past.

In some embodiments, the API provides a plurality of methods with which a user can query a configuration repository, such as a relational database. Each method provides a way to query the configuration repository for metadata related to one, some or all of the objects associated with an application. When a method call is received, a logic component uses the contents of an application's object tables and intermediate tables in the configuration repository to construct a hierarchical tree of the objects in the application. For example, the logic component may identify the highest level intermediate table for the application that contains the requested object or objects. From the objects contained in the highest level intermediate table, the logic component can construct a hierarchical tree of the objects in the application. The logic component can create the hierarchical tree by identifying the intermediate tables that are at the lower levels in the application hierarchy, one level at a time, until it reaches the object tables at the lowest level of the hierarchy. The intermediate tables contain the objects that are the intermediate nodes in the hierarchy, and the object tables at the lowest level of the hierarchy contain the leaf nodes. Once at a leaf node, the logic component can traverse up the path of intermediate nodes to the root node to unambiguously identify the leaf node. The logic component can unambiguously identify each intermediate node by traversing up the path of higher-level intermediate nodes to the root node. In some embodiments, the logic component constructs the hierarchical tree of objects only to the hierarchical level that contains the requested object or objects. The logic component can then unambiguously represent each object (i.e., node) in the hierarchical tree of objects by traversing the path from the object back up to the root object. Thus, the logic component is able to return an unambiguous representation of an object or objects that are requested via the API.

In some embodiments, the API comprises a "getRootObjects" method, a "getChildObjects" method, a "getContainerObjects" method, and a "getAllObjects" method. The getRootObjects method provides a list of application objects from the configuration repository. The hierarchy of objects is (1) application; (2) screen; (3) view; (4) applets; and (5) elements. An application is the highest or the root object, and is the starting point for generating a hierarchical tree for the respective application. The getChildObjects method provides the objects that are the direct children of a specified object. Stated differently, getChildObjects provides the child objects that are at the next-lower hierarchical level than the specified object. The getContainerObjects method provides the container (or non-leaf) objects that are at a lower hierarchical level than a specified object. The getAllObjects method provides all the objects that are at a lower hierarchical level than a specified object. Using the method calls provided by the API, the user can identify the applications, and for each application, can construct a hierarchical representation of each node in the application.

Figure 1:
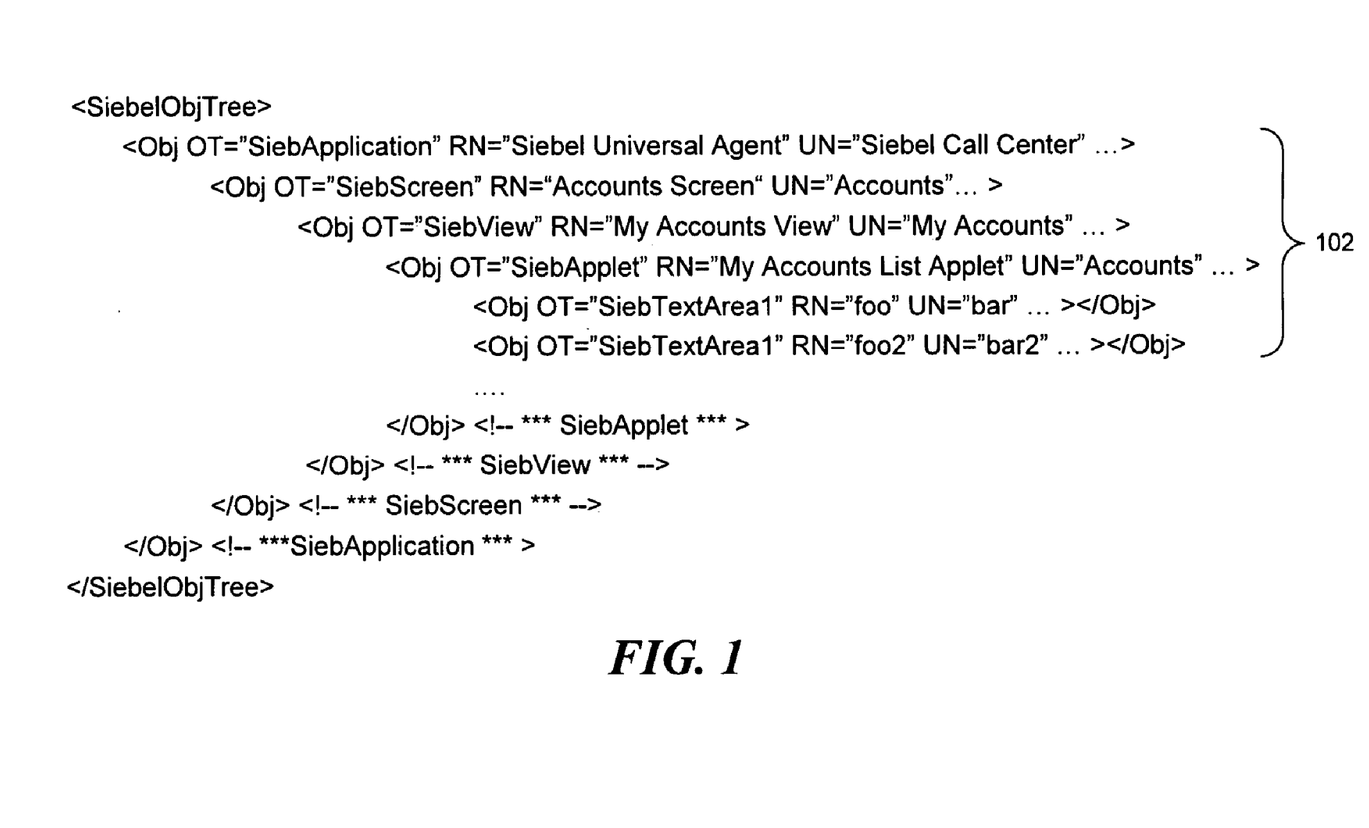
FIG. 1 illustrates an example XML format for the ODS syntax, according to some embodiments.

In some embodiments, objects are unambiguously described using an object descriptor string (ODS) syntax. The ODS syntax may be represented using an extended markup language (XML) format that defines the structure of the application objects in their hierarchy, including the object properties and data values. FIG. 1 illustrates an example XML format for the ODS syntax, according to some embodiments. For example, the XML format illustrated in FIG. 1 may have been returned by one of the method calls supported by the API. As depicted, the XML format comprises one or more elements 102, where each element represents an object in the object hierarchy of an application. For an element, the attribute "OT" specifies an object type, "RN" specifies a repository name, and "UN" specifies a UI name. An element may also contain other attributes that describe its respective object. Each object in the hierarchy exists within the context of some other object in the hierarchy. Within the XML format, the unambiguous representation of an object includes the hierarchical path for that object, starting from the root to that point in the hierarchy where the object is found within the hierarchy. In other embodiments, the ODS syntax may be represented using any of a variety of well-known formats that are suitable for defining the structure of the application objects in their hierarchy. In some embodiments, the objects may be unambiguously described using any of a variety of well-known syntaxes other than ODS, such as, by way of example, a natural language pathname that uniquely identifies a path of objects in the hierarchical tree.

In some embodiments, the API provides a web services-based interface to query the configuration repository. For example, the API may be deployed as a Java web service, and the API may connect to the configuration repository using the Java Database Connectivity (JDBC) interface. As is generally known, JDBC is a Java API that enables Java programs to execute structured query language (SQL) statements. The server that hosts the web service (i.e., the API) contains the JDBC drivers that are required to connect to the different SQL configuration repositories. Since web services are stateless, each API call is atomic and, thus, performs the following operations: (1) open a database connection; (1) perform queries; (3) close the database connection; and (4) return results.

II. System Overview and Overall Architecture

Figure 2:
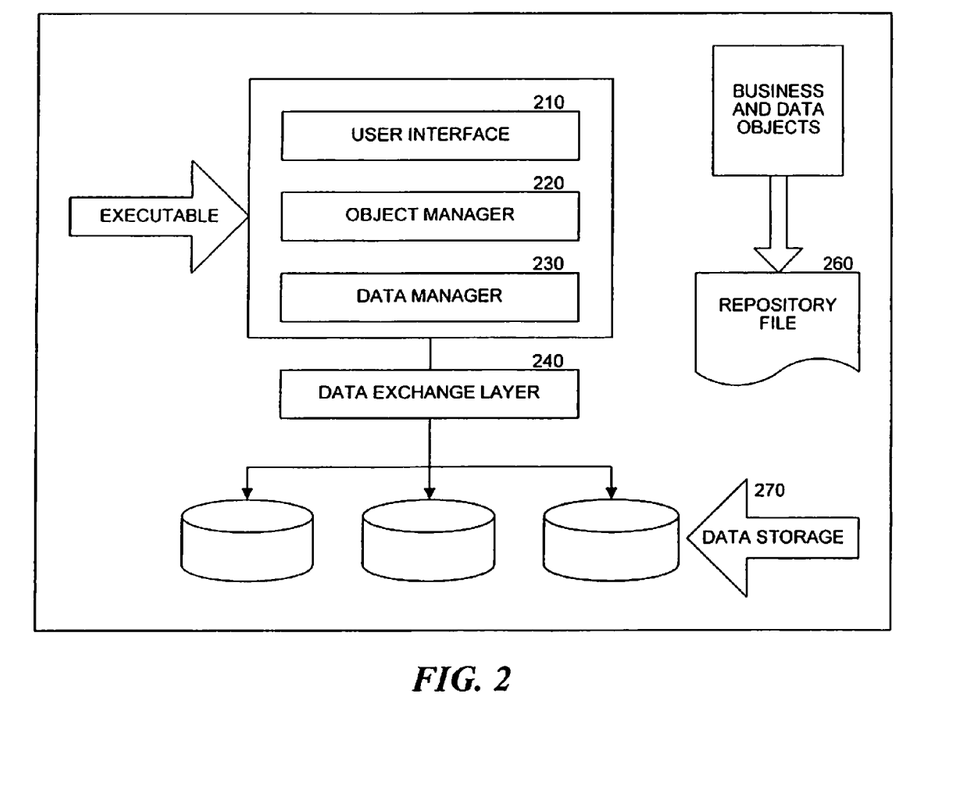
FIG. 2 is a block diagram that illustrates a multi-layered system architecture within which the described techniques can be implemented.

FIG. 2 is a block diagram that illustrates a multi-layered system architecture within which the described techniques can be implemented. In particular, the logical multi-layered architecture as shown in FIG. 2 provides a platform for common services to support various applications. These services may include a user interface layer 210, an object manager layer 220, a data manager layer 230, and a data exchange layer 240.

The user interface layer may provide a variety of high-level GUI elements such as applets, views, charts and reports that are associated with one or more applications. In one embodiment, various types of clients can be supported via the user interface layer. These various types of clients may include traditional connected clients, remote clients, thin clients over an intranet, Java thin clients, ActiveX clients, HTML clients over the Internet, etc.

The object manager layer may be designed to manage one or more sets of business rules or business concepts associated with one or more applications and to provide the interface between the user interface layer and the data manager layer. In one embodiment, the business rules or concepts can be represented as business (or "business process") objects. The business objects may also be designed as configurable software representations of various business rules or concepts, such as accounts, contacts, opportunities, service requests, solutions, suspects, terrorist groups, diseases, medications, and cases, etc.

The data manager layer may be designed to maintain logical views of the underlying data and to allow the object manager to function independently of underlying data structures or tables in which data are stored. In one embodiment, the data manager may also provide certain database query functions such as generation of structured query language (SQL) in real-time to access the data. In one embodiment, the data manager is designed to operate on object definitions in a repository file 260 that define the database schema. The data storage services 270 provide the data storage for the data model associated with one or more applications.

The data exchange layer may be designed to handle the interactions with one or more specific target databases and to provide the interface between the data manager layer and the underlying data sources.

Figure 3:
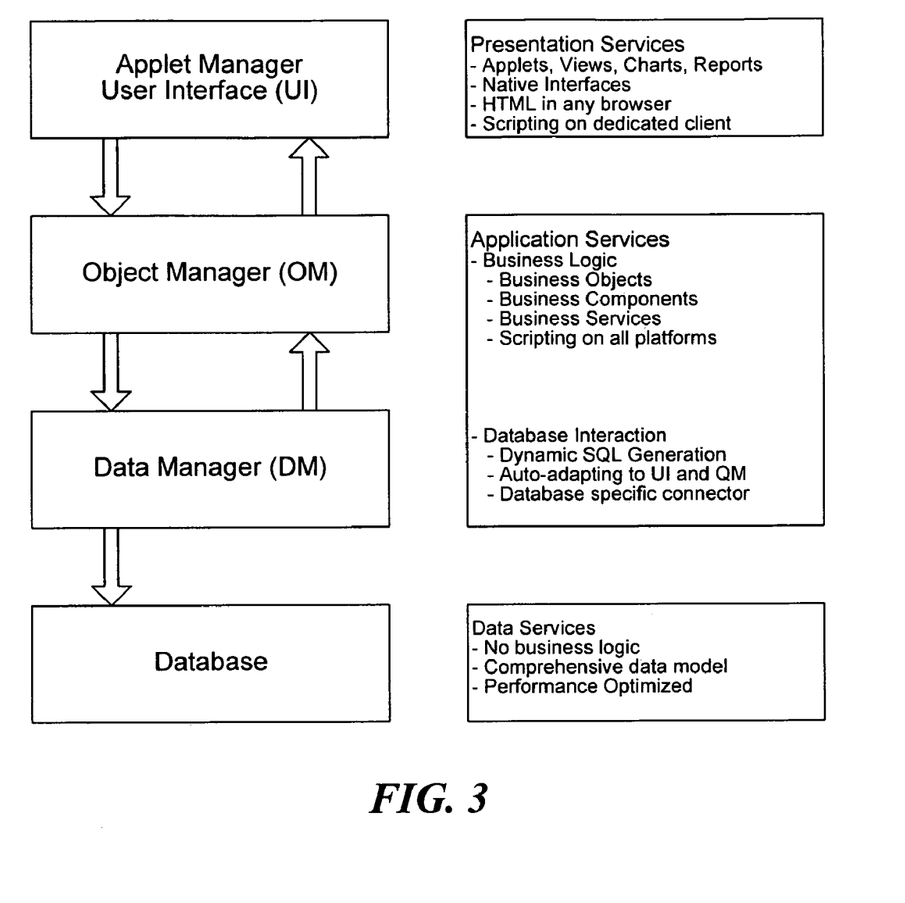
FIG. 3 is a block diagram that illustrates another logical representation of a multi-layered architecture within which the described techniques can be implemented.

FIG. 3 is a block diagram that illustrates another logical representation of a multi-layered architecture within which the described techniques can be implemented. Again, the multi-layered architecture as illustrated in FIG. 3 provides the configured platform for various common services designed to support the various applications. In one embodiment, these various services may include presentation services which correspond to an applet manager and user interface layer, application services which correspond to an object manager (OM) layer and a data manager (DM) layer, and data services which correspond to a database layer.

In one embodiment, the presentation services may be designed and configured to support various types of clients and may provide them with user interface applets, views, charts, and reports, etc. A large variety of clients may be supported including wireless clients, handheld clients, Web clients, mobile Web clients, and dedicated (connected) clients, etc.

In one embodiment, the application services may include business logic services and database interaction services. In one embodiment, business logic services provide the class and behaviors of business objects and business components. In one embodiment, database interaction services may be designed and configured to take the user interface (UI) request for data from a business component and generate the database commands (e.g., SQL queries) necessary to satisfy the request. For example, the data interaction services may be used to translate a call for data into DBMS-specific SQL statements.

In one embodiment, data storage services may be designed and configured to provide the data storage for the underlying data model which serves as the basis of the various applications. For example, the data model may be designed and configured to support various software products and applications including call center, sales, services, and marketing, etc., as well as various industry vertical products and applications such as eFinance, eInsurance, eCommunications, and eHealthcare, etc.

Figure 4:
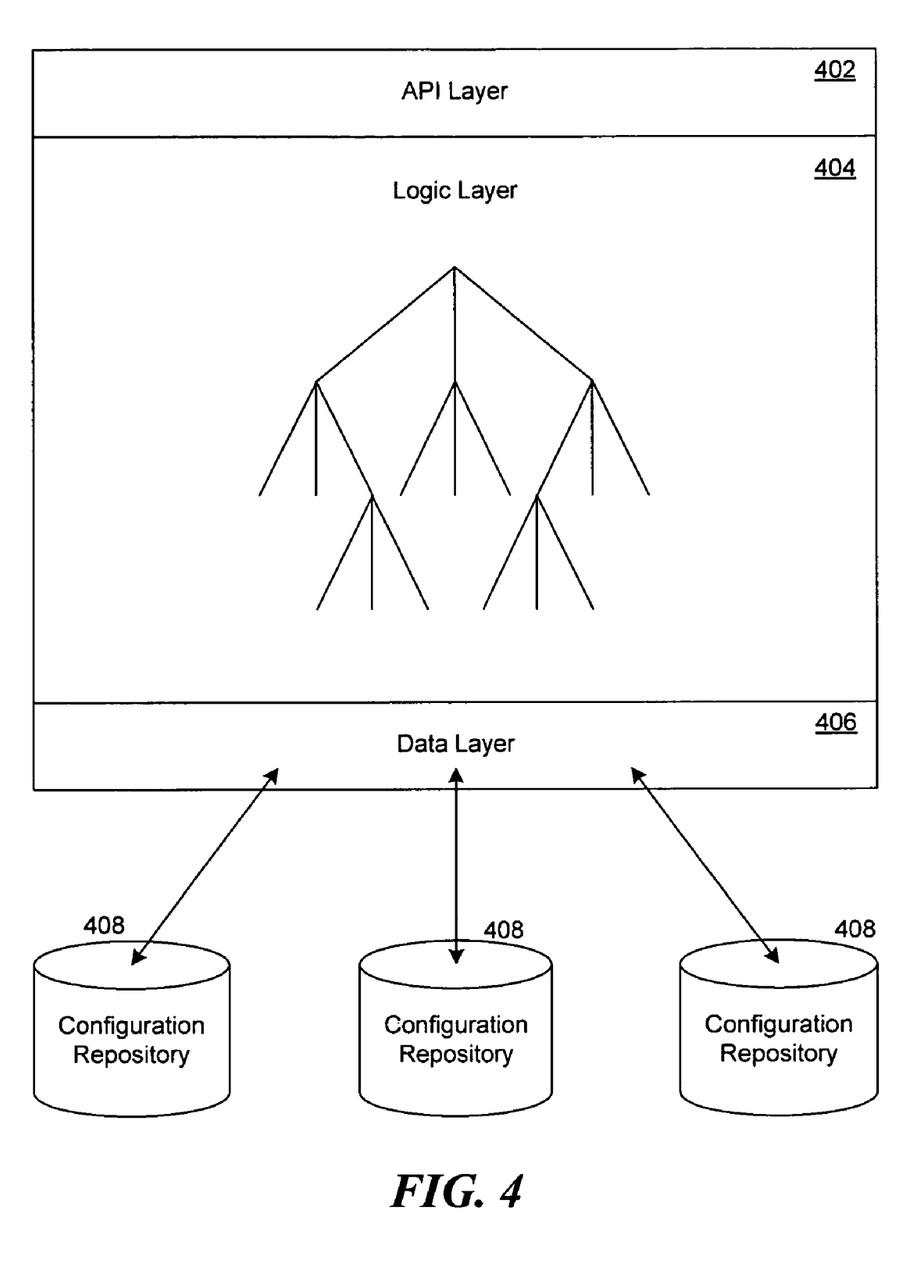
FIG. 4 is a block diagram that illustrates a system architecture that implements the described techniques, according to some embodiments.

FIG. 4 is a block diagram that illustrates a system architecture that implements the described techniques, according to some embodiments. The system architecture includes an API layer 402, a logic layer 404, a data layer 406, and configuration repositories 408. The API layer provides a variety of method calls which may be used to query the configuration repository for the metadata related to an object or multiple objects associated with an application. The method calls return an unambiguous representation of the requested objects or objects. The unambiguous representation of the objects allows the objects to be easily consumed (e.g., understood, utilized, etc.) by software programs, such as test automation tools and applications.

In some embodiments, the API layer provides error handling and diagnostic logging. For example, the API layer can check the method calls for errors, and if an error is encountered in a method call invocation, the API layer can create an entry in an error log to record the error condition. In some embodiments, the API layer provides search specifications to allow a user of the API to specify query criteria. For example, one or more of the provided method calls may allow for specifying a start date/time for object creation, an end date/time for object creation, a start date/time for object modification, an end date/time for object modification, a creator of the object or objects, a last modifier of the object or objects, or other filters for accessing the object or objects. The filters allow for a finer grained access to the desired metadata (e.g., application objects).

The logic layer processes the method calls received via the API layer. When a method call is received, the logic layer queries the configuration repository (e.g., the object tables and the intermediate tables) for the data that is necessary to service the method call. The logic layer then uses the retrieved data to construct a hierarchical tree or representation, from which the objects can be unambiguously represented. The logic layer then uses the created hierarchical tree to return the metadata that is appropriate for the invoked method call.

The data layer provides an interface between the logic layer and the underlying configuration repositories. For example, the data layer may be designed to handle the queries made by the logic layer for the data contained in the configuration repositories. The configuration repositories provide the data storage for the data model, including the objects, tables, etc., associated with one or more applications.

The computing device on which the various techniques for providing the API is implemented may include a central processing unit, memory, input devices (e.g., keyboard and pointing devices), output devices (e.g., display devices), and storage devices (e.g., disk drives). The memory and storage devices are computer-readable media that may contain instructions that implement the techniques for providing the API. In addition, the data structures and message structures may be stored or transmitted via a data transmission medium, such as a signal on a communications link. Various communication links may be used, such as the Internet, a local area network, a wide area network, a point-to-point dial-up connection, a cell phone network, and so on.

Embodiments of the techniques for providing the API may be implemented in various operating environments that include personal computers, server computers, hand-held or laptop devices, multiprocessor systems, microprocessor-based systems, programmable consumer electronics, digital cameras, network PCs, minicomputers, mainframe computers, network devices, distributed computing environments that include any of the above systems or devices, and so on. The computer systems may be cell phones, personal digital assistants, smart phones, personal computers, programmable consumer electronics, digital cameras, and so on.

The various techniques for providing the API may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

III. Additional Details

Figure 5:
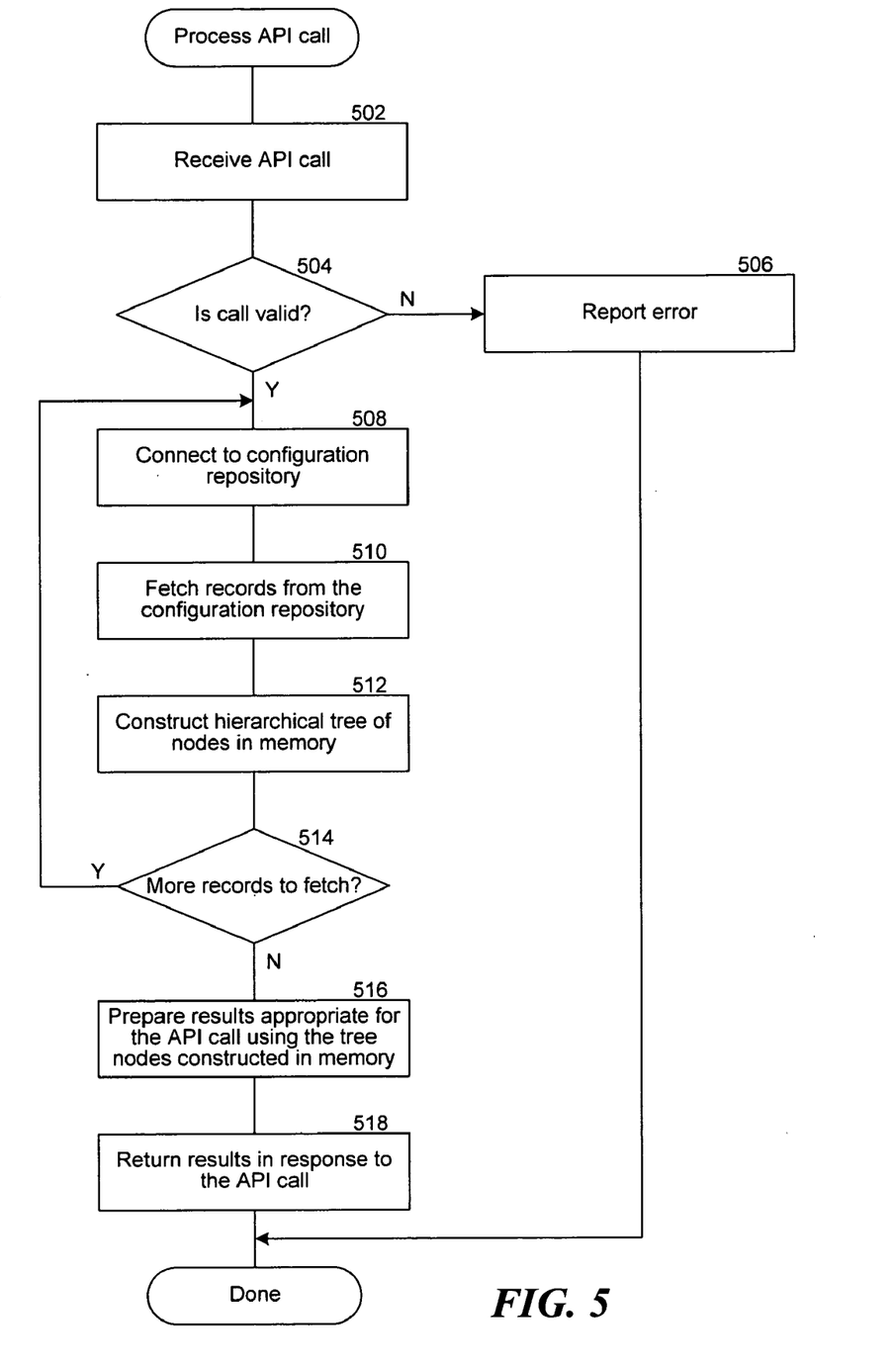
FIG. 5 is a flow diagram that illustrates the processing of an API call, according to some embodiments.

FIG. 5 is a flow diagram that illustrates the processing of an API call, according to some embodiments. In block 502, the API layer receives an API call. In block 504, the API layer checks to determine whether the received API call is valid. For example, the API layer can parse and validate the syntax of the call and the input parameter values that are passed with the call. The API layer extracts a "starting point" object (i.e., the parent object) from the API call if such an object is provided in the API call. If the API layer determined that the received API call is invalid, then, in block 506, the API layer reports the error condition. For example, the API layer can return an appropriate error to the caller in response to the received API call.

Otherwise, if, in block 504, the API layer determined that the received API call is valid, then, in block 508, the API layer may use the data layer to connect to the configuration repository that is appropriate for retrieving the records necessary for responding to the received API call. The API layer may invoke the logic layer to continue processing the received API call. In block 510, the logic layer fetches the records from the tables, such as the object tables and the intermediate tables, in the configuration repository. For example, the logic layer executes a query for the records in the configuration repository that contain information (e.g., metadata) related to the objects that are needed to appropriately respond to the received API call. In some embodiments, the logic layer retrieves the records from the configuration repository one level at a time until the target depth is reached. The target depth is determined based on the received API call. For example, if the received API call is a request to retrieve all the root objects, then the logic layer retrieves the records from the configuration repository, one level at a time, until the records corresponding to the root objects are retrieved. In another example, if the received API call is a request to retrieve all of the container objects, then the logic layer retrieves the records from the configuration repository, one level at a time starting from, for example, the highest level container object (i.e., the root object) to the lowest level container object, until the records corresponding to all of the container objects are retrieved.

In block 512, the logic layer constructs a hierarchical tree of nodes in memory. The logic layer populates the nodes of the hierarchical tree with attributes of the objects contained in the records retrieved in block 510. In block 514, the logic layer checks to determine if there are more records to fetch from the configuration repository. If there are more records to fetch, then the logic layer loops to block 508 and connects to the configuration repository in order to fetch the additional records. For example, the logic layer may need to fetch child objects (i.e., the child nodes) from the configuration repository in order to appropriately respond to the received API call. Otherwise, if there are no more records to fetch (i.e., the logic layer fetched all of the records that are necessary to construct the hierarchical tree appropriate for processing the received API call), then, in block 516, the logic layer prepares the results appropriate for the received API call using the hierarchical tree nodes constructed in memory. For example, for each node in the tree that represents an object that is needed to respond to the received API call, the logic layer creates an unambiguous representation of the object by traversing up a path in the tree from the node to the root node. In block 518, the logic layer returns the results via the API layer in response to the received API call. For example, the returned results are the unambiguous representation of the objects that are requested by the API call.

One skilled in the art will appreciate that, for this and other processes and methods disclosed herein, the functions performed in the processes and methods may be implemented in differing order. Furthermore, the outlined steps are only exemplary, and some of the steps may be optional, combined into fewer steps, or expanded into additional steps without detracting from the essence of the invention.

IV. Example Methods

The following are example methods provided by the API.

The getRootObjects method returns a list of root objects that will serve as starting points (i.e., startingODS) for the other methods in the API. The getRootObjects is the first method to call in order to learn the object hierarchy for an application. In some embodiments, the getRootObjects method returns an error if any of the input parameters are invalid or if a database connection failure occurs.

string getRootObjects
 (string dbName, string dbUserName, string dbUserPassword; string dbTableOwner, string repLang, string repository, string startingCreatedOn, string endingCreatedOn, string startingUpdatedOn, string endingUpdatedOn, string createdBy, string updatedBy)

Inputs:
string dbName (Required)—string input specifying the data source pointing to a configuration repository.
string dbUserName (Required)—string input specifying a privileged database username.
string dbUserPassword (Required)—string input specifying the database password for user dbUserName.
string dbTableOwner (Required)—string input specifying the table owner for the specified dbName.
string repLang (Optional)—string denoting the 3-letter language code for a supported language. This parameter specifies the language for the display names in the result set.
string repository (Optional)—string input specifying the repository name to connect to. If an empty string is supplied, a predetermined default value is used.
string startingCreatedOn (Optional)—input date/time filter to only select those objects created at or after the specified date/time.
string endingCreatedOn (Optional)—input date/time filter to only select those objects created at or before the specified date/time.
string startingUpdatedOn (Optional)—input date/time filter to only select those objects updated at or after the specified date/time.
string endingUpdatedOn (Optional)—input date/time filter to only select those objects updated at or before the specified date/time.
String createdBy (Optional)—input filter to only select objects created by the specified userid.
String updatedBy (Optional)—input filter to only select objects updated by the specified userid.

Output:
getRootObjects( ) returns an XML string based on the ODS format, containing a list of root objects.

The getChildObjects method returns an ODS tree containing only the direct children of the given startingODS parameter value.

string getChildObjects
 (string dbName, string dbUserName, string dbUserPassword; string dbTableOwner, string repLang, string repository, string startingODS, string startingCreatedOn, string endingCreatedOn, string startingUpdatedOn, string endingUpdatedOn, string createdBy, string updatedBy)

Inputs:
string startingODS (Required)—an ODS for the parent object for which child objects are to be returned.
Others—refer to the getRootObjects method above.

Output:
getChildObjects( ) returns an XML string containing the direct children of the given startingODS node.

The getContainerObjects method returns an ODS tree containing only container (non-leaf) objects fetched from the configuration repository, for the given startingODS parameter value.

string getContainerObjects
 (string dbName, string dbUserName, string dbUserPassword; string dbTableOwner, string repLang, string repository, string startingODS, string startingCreatedOn, string endingCreatedOn, string startingUpdatedOn, string endingUpdatedOn, string createdBy, string updatedBy)

Inputs:
string startingODS (Required)—an ODS specifying a parent object for which container objects are to be returned.
Others—refer to the getRootObjects method above.

Output:
getContainerObjects( ) returns an XML string containing all container objects for the given startingODS node.

The getAllObjects method returns an ODS tree containing all objects fetched from the configuration repository, for the given startingODS parameter value.

string getAllObjects
 (string dbName, string dbUserName, string dbUserPassword; string dbTableOwner, string repLang, string repository, string startingODS, string startingCreatedOn, string endingCreatedOn, string startingUpdatedOn, string endingUpdatedOn, string createdBy, string updatedBy)

Inputs:
string startingODS (Required)—an ODS specifying a parent object for which all objects are to be returned.
Others—refer to the getRootObjects method above.

Output:
getAllObjects( ) returns an XML string containing all objects for the given startingODS node.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Even though the processing of an API call has been described in the context of a specific API architecture, and with specific components of the API architecture performing certain functions related to processing the API call, it will be appreciated that the API call processing is not restricted to the described components of the API architecture. For example, the API architecture may not include the logic layer and/or the data layer, and the functions performed by the omitted layers may be performed by the API layer. As another example, the API architecture may include other components or modules that are not depicted, and these additional components and modules may perform some of the processing necessary to process the API call. In some embodiments, the logic layer may use any of a variety of well-known techniques to construct the hierarchical tree in memory. In some embodiments, the logic layer may always construct a full hierarchical tree in memory even though only a partial tree is needed to respond to the API call. Accordingly, the invention is not limited except as by the appended claims.

We claim:

1. A method comprising:
issuing, by a first process, a request for at least one object stored in a first configuration repository, wherein
the first process comprises an automated test tool;
receiving, by a second process, the request for the at least one object stored in the first configuration repository, wherein
the second process comprises a software development tool,
the at least one object is stored in the first configuration repository in a normalized format, and
the first configuration repository is under the control of the second process,
retrieving one or more records from the first configuration repository, wherein
an application program interface (API) is configured to retrieve the one or more records;
constructing a hierarchical tree of nodes;
generating a representation of the requested at least one object using the hierarchical tree of nodes;
issuing a response to the request for the at least one object stored in the first configuration repository, the response comprising the representation of the requested at least one object;
retrieving the at least one object from the first configuration repository, wherein the first process uses the response to retrieve the at least one object; and
synchronizing the automatic test tool with a second configuration repository, wherein
the synchronizing comprises storing the at least one object in the second configuration repository,
the second configuration repository is under control of the first process, and
the first process is configured to use the at least one object from the second configuration repository to test an application.

2. The method of claim 1, wherein the requested at least one object is associated with the application.

3. The method of claim 2, wherein the representation of the requested at least one object includes a hierarchical path for the requested at least one object within the application.

4. The method of claim 1, wherein the request for the at least one object is a request for a root object, the root object corresponding to an application in the first configuration repository.

5. The method of claim 1, wherein the request for the at least one object is a request for a child object of a specified parent object, wherein the child object is a direct child of the specified parent object.

6. The method of claim 1, wherein the request for the at least one object is a request for a container object of a specified parent object.

7. The method of claim 1, wherein the request for the at least one object is a request for all objects of a specified parent object.

8. The method of claim 1, wherein the requested at least one object is represented in an XML format.

9. The method of claim 1 wherein the response is used to create an application.

10. The method of claim 1, further comprising:
creating a test automation asset, wherein
the automated test tool creates the test automation asset, and
the test automation asset comprises the at least one object.

11. A method in a computer system, the method comprising:
receiving a request for at least one object stored in a first configuration repository, wherein
the computer system is configured to receive the request from a first process, wherein
the first process comprises an automated test tool,
the at least one object is stored in the first configuration repository in a normalized format, and
the first configuration repository is under the control of a second process, wherein
the second process comprises a software development tool;
retrieving records from the first configuration repository that correspond to the requested at least one object, wherein
an application program interface (API) is configured to retrieve the one or more records;
constructing a hierarchical tree of nodes;
generating a representation of the requested at least one object from the hierarchical tree of nodes; and
responding to the request for the at least one object stored in the first configuration repository, wherein
the response comprises the representation of the requested at least one object, and
the response is configured to facilitate retrieval of the at least one object from the first configuration repository by the first process;
synchronizing the automatic test tool with a second configuration repository, wherein
the synchronizing comprises storing the at least one object in the second configuration repository, and
the at least one object from the second configuration repository is configured to be used by the first process to test an application.

12. The method of claim 11, wherein the records are retrieved from the first configuration repository one level at a time.

13. The method of claim 11, wherein constructing the hierarchical tree of nodes comprises populating the nodes with attributes of the objects contained in the retrieved records.

14. The method of claim 11, wherein the request for the at least one object comprises a query criteria.

15. The method of claim 14, wherein the query criteria includes a specification of a start date for the creation of the requested at least one object.

16. The method of claim 14, wherein the query criteria includes a specification of an end date for the creation of the requested at least one object.

17. The method of claim 14, wherein the query criteria includes a specification of a start time for the modification of the requested at least one object.

18. The method of claim 14, wherein the query criteria includes a specification of an end time for the modification of the requested at least one object.

19. The method of claim 14, wherein the query criteria includes a specification of a creator of the requested at least one object.

20. The method of claim 14, wherein the query criteria includes a specification of a last modifier of the requested at least one object.

21. A computer-readable storage medium containing instructions for providing access to a first configuration repository, by a method comprising:
- receiving a request from a first process for at least one object stored in the first configuration repository, wherein
  - the first process comprises an automated test tool,
  - the request is received by a second process, wherein the second process comprises a software development tool,
  - the at least one object is stored in the first configuration repository in a normalized format,
  - the first configuration repository is under the control of the second process;
- retrieving records from the first configuration repository that corresponds to the requested at least one object, wherein
  - an application program interface (API) is configured to retrieve the one or more records;
- constructing a hierarchical tree of nodes;
- generating a representation of the requested at least one object from the hierarchical tree of nodes;
- generating a response to the request for the at least one object stored in the first configuration repository, the response comprising the representation of the requested at least one object;
- retrieving the at least one object from the first configuration repository, wherein the first process uses the response to retrieve the at least one object; and
- synchronizing the automatic test tool with a second configuration repository, wherein
  - the synchronizing comprises storing the at least one object in the second configuration repository,
  - the second configuration repository is under control of the first process, and
  - the first process is configured to use the at least one object from the second configuration repository to test an application.

22. The computer-readable storage medium of claim 21, wherein the representation of the objects includes the hierarchical path of the objects within an application that comprises the objects.

* * * * *